United States Patent
Park et al.

(10) Patent No.: US 9,482,321 B2
(45) Date of Patent: Nov. 1, 2016

(54) POWER TRAIN FOR HYBRID VEHICLE

(71) Applicant: Hyundai Motor Company, Seoul (KR)

(72) Inventors: Jong Yun Park, Hwaseong-si (KR); Ki Nam Kim, Seongnam-si (KR); Shin Jong Kim, Hwaseong-si (KR); Won Il Lee, Hwaseong-si (KR); Tae Won Kim, Seoul (KR); Jin Sook Lee, Uijeongbu-si (KR); Jang Mi Lee, Tongyeong-si (KR); Jae Young Choi, Busan (KR); Sung Ik Bae, Suwon-si (KR); Eui Cheol Chung, Seoul (KR); Kyung Ha Kim, Yongin-si (KR); Min Sung Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 36 days.

(21) Appl. No.: 14/559,771

(22) Filed: Dec. 3, 2014

(65) Prior Publication Data

US 2016/0091070 A1    Mar. 31, 2016

(30) Foreign Application Priority Data

Sep. 29, 2014  (KR) .................. 10-2014-0130098

(51) Int. Cl.
| | |
|---|---|
| B60K 6/365 | (2007.10) |
| F16H 3/72 | (2006.01) |
| F16H 37/06 | (2006.01) |
| B60K 6/383 | (2007.10) |
| B60K 6/445 | (2007.10) |
| B60K 6/38 | (2007.10) |
| F16H 37/08 | (2006.01) |

(52) U.S. Cl.
CPC .............. *F16H 3/728* (2013.01); *B60K 6/383* (2013.01); *B60K 6/445* (2013.01); *B60K 2006/381* (2013.01); *F16H 2037/0873* (2013.01); *F16H 2200/2005* (2013.01); *F16H 2200/2094* (2013.01); *Y10S 903/917* (2013.01)

(58) Field of Classification Search
CPC ................. B60K 6/365; F16H 2200/0021
See application file for complete search history.

(56) References Cited

U.S. PATENT DOCUMENTS

| | | | | |
|---|---|---|---|---|
| 7,766,779 B2 * | 8/2010 | Belmont | .................. | B60K 6/36 192/69.8 |
| 2005/0064974 A1 * | 3/2005 | Bezian | ................... | B60K 6/365 475/5 |
| 2010/0009805 A1 * | 1/2010 | Bachmann | ............. | B60K 6/365 477/5 |
| 2012/0115659 A1 * | 5/2012 | Yamada | ................ | B60K 6/365 475/5 |

FOREIGN PATENT DOCUMENTS

| | | |
|---|---|---|
| JP | 9-117010 A | 5/1997 |
| JP | 2011-102053 A | 5/2011 |
| KR | 10-2009-0129049 A | 12/2009 |
| KR | 10-2010-0095077 A | 8/2010 |
| KR | 10-2012-0140099 A | 12/2012 |

* cited by examiner

*Primary Examiner* — Tisha Lewis
(74) *Attorney, Agent, or Firm* — Morgan, Lewis & Bockius LLP

(57) ABSTRACT

A powertrain for a hybrid vehicle may include a first input shaft connected to a motor generator and coupled to a dog clutch apparatus, and a second input shaft connected to an engine and coupled to a planetary gear set, in which when the vehicle is overdriven, the dog clutch apparatus is engaged and restricts one component of the planetary gear set.

6 Claims, 7 Drawing Sheets

POWER TRAIN FOR HYBRID VEHICLE

CROSS REFERENCE TO RELATED APPLICATION

The present application claims priority to Korean Patent Application Number 10-2014-0130098 filed Sep. 29, 2014, the entire contents of which is incorporated herein for all purposes by this reference.

BACKGROUND OF THE INVENTION

1. Field of the Invention

The present invention, in general, relates to a powertrain for a hybrid vehicle, and, more particularly, to a powertrain for a hybrid vehicle which is advantageous in terms of improvement of fuel efficiency, weight, and manufacturing cost without a requiring a valve body and an oil pump for hydraulic pressure by replacing a brake with a dog clutch, because, in the related art, when a vehicle runs in a high-speed period, a brake is connected to a motor generator and a so-called overdrive (OD) gear ratio is implemented, but according to the configuration of the present invention, there is no need for a valve body and an oil pump for hydraulic pressure for operating the brake.

2. Description of Related Art

A hybrid vehicle equipped with a hybrid transmission composed of an engine, a motor generator, and a planetary gear set can run in an electric vehicle mode for driving the vehicle only with the motor usually during starting and in a low-speed period, and when the vehicle speed increases, the transmission operates as an EVT (Electrically Variable Transmission), so the vehicle can run in a power division mode for more efficient use of the engine power and the motor power, in which, similar to the existing transmission, a fixed gear ratio can be used to further improve power performance of the vehicle.

A system based on this concept is designed to improve an idle-stop function, maximize regenerative braking, and improve fuel efficiency and power performance of a vehicle.

Further, no exhaust gas is produced by the engine and the engine can be driven with optimum fuel efficiency while the hybrid vehicle is driven by only the motor generator, so it is recognized as an environment-friendly automotive technology having the advantage of improved fuel efficiency and reduced exhaust gas.

The power transmission system of such a hybrid vehicle may be designed to implement various driving modes with a simple configuration in order to improve fuel efficiency of the vehicle and to improve drivability of the vehicle, for example, improving acceleration ability, by changing the driving modes in accordance with the driving conditions of the vehicle.

FIG. 1 shows a layout of a transmission of a hybrid vehicle in the related art and FIG. 2A and FIG. 2B are views showing shifting for overdriving in a high-speed period. Problems in overdriving due to the layout of a transmission in the related art are described hereafter with reference to the accompanying drawings.

The thick lines in the layout of a transmission shown in the drawings indicate power transmission paths.

As shown in the figures, a brake 30 is coupled to an input shaft 20 connected to a motor generator 10.

Before the brake 30 is coupled to the input shaft 20, a process of stopping revolution of the motor generator by means of an external power supply was performed to overdrive a vehicle, but efficiency of the vehicle and fuel efficiency are decreased due to the continuous power supply, so the layout that restricts the motor generator 10 with the brake 10, as in FIG. 1, has been proposed.

Shifting by the layout of a transmission of the related art when a vehicle runs in a high-speed period is described hereafter with reference to FIG. 2A and FIG. 2B.

As shown in FIG. 2A and FIG. 2B, when a vehicle normally runs, shifting is performed by controlling a motor generator, and as the vehicle speed increases, hydraulic pressure is applied to a brake to implement an OD gear ratio, and the motor generator is restricted and a sun gear, that is one of the components of a planetary gear set 40 at a side of an engine, is restricted by the operation of the brake, thereby overdriving the vehicle.

That is, when a vehicle runs at an overdrive gear ratio in a high-speed period, the brake is connected to the motor generator and hydraulic pressure is applied to the brake, so the vehicle runs with the motor generator controlled; however, it is the problem of the related art that since the motor generator is controlled by the brake, there is a need for an oil pump for hydraulic pressure other than a valve body, so the fuel efficiency decreases and the weight and manufacturing cost increase.

Further, the brake itself acts as a 'drag' element in shifting while the vehicle runs.

Accordingly, the present invention provides a power train for a hybrid vehicle without a separate friction element such as a brake by replacing a brake controlling a motor generator with a dog clutch in order to achieve the function of synchronizing rotation speeds through revolution of a motor generator of the related art and to achieve the engagement function with the dog clutch.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a powertrain for a hybrid vehicle that is advantageous in terms of improvement of fuel efficiency, weight, and manufacturing cost by replacing a brake used for overdriving in the related art with a dog clutch in order to achieve the function of synchronizing rotation speeds with a motor generator of the related art and to achieve the engagement function with the dog clutch.

According to various aspects of the present invention, a powertrain for a hybrid vehicle may include a first input shaft connected to a motor generator and coupled to a dog clutch apparatus, and a second input shaft connected to an engine and coupled to a planetary gear set, in which when a vehicle is overdriven, the dog clutch apparatus is engaged and restricts one component of the planetary gear set.

A first free gear, which is connected to a sun gear that is one of the components of the planetary gear set when the dog clutch is engaged, may be disposed at an end of the first input shaft.

A third input shaft having a first rotary gear and a second rotary gear at both ends may be provided to be connected to a ring gear of the planetary gear set and to transmit power from the engine when the dog clutch is engaged.

The powertrain may further include an output shaft having a driving gear engaged and rotated with the first rotary gear.

When the vehicle runs at a high speed, synchronization may be performed by an external power source by restricting rotation of the motor generator and then the dog clutch apparatus may be engaged with a fixing apparatus.

When the vehicle runs at the high speed, the dog clutch may be engaged with the fixing apparatus, rotation of the sun gear of the planetary gear set may be restricted, a carrier of the planetary gear set may be rotated by power from the engine, and the second rotary gear engaged with the carrier and the driving gear may be rotated, and transmit power to the output shaft and the vehicle may start to run at an overdrive gear ratio.

According to the powertrain for a hybrid vehicle having the configuration described above, since a dog clutch is used instead of a brake used in the related art, there is no need for a valve body and an oil pump, so there are various advantages in terms of manufacturing cost, weight, and fuel efficiency.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

In FIGS. 5A-5D, solid arrow lines denote a power flow by a motor generator and alternated long and short dash arrow lines denote a power flow by an engine.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention addresses a layout of a powertrain for a hybrid vehicle that includes a dog clutch instead of a brake, which was used to implement an overdrive gear ratio when a vehicle runs at a high speed.

The term 'restricting gear' used herein means a gear that is fitted on a shaft and restricts another restricted gear in its rotational direction, so the two gears can keep applying torque to each other, while the term 'free gear' means a gear that is fitted on a shaft and can basically freely rotate relative to another free gear.

That is, the restricting gear may be formed integrally with a shaft or coupled to the shaft by a spline or a key, while the free gear may be coupled to a shaft by a bush or a bearing.

Figure 3:
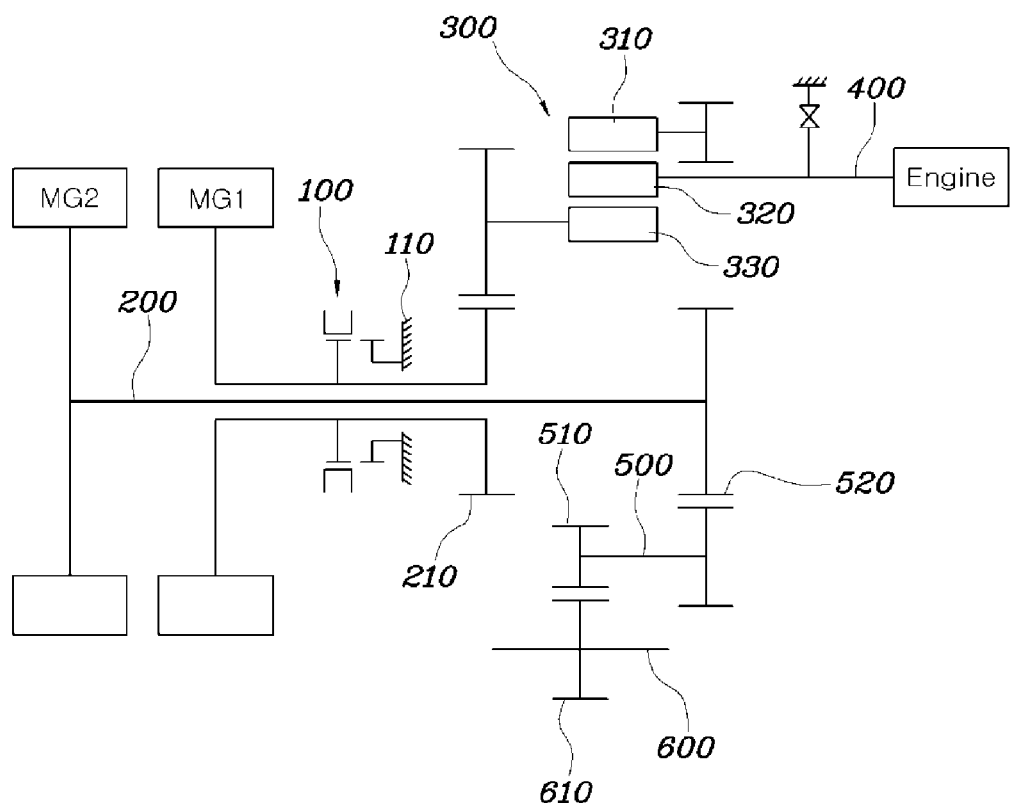
FIG. 3 is a diagram showing a layout of an exemplary powertrain for a hybrid vehicle according to the present invention.

FIG. 3 is a diagram showing a layout of a powertrain for a hybrid vehicle of the present invention. As shown in FIG. 3, the present invention includes a first input shaft 200 having a dog clutch unit 100 and a second input shaft 400.

A motor generator supplying power is connected to the first input shaft 200 and the dog clutch unit 100 that restricts revolution of a motor generator is formed at a side of the first input shaft 200.

Figure 1:
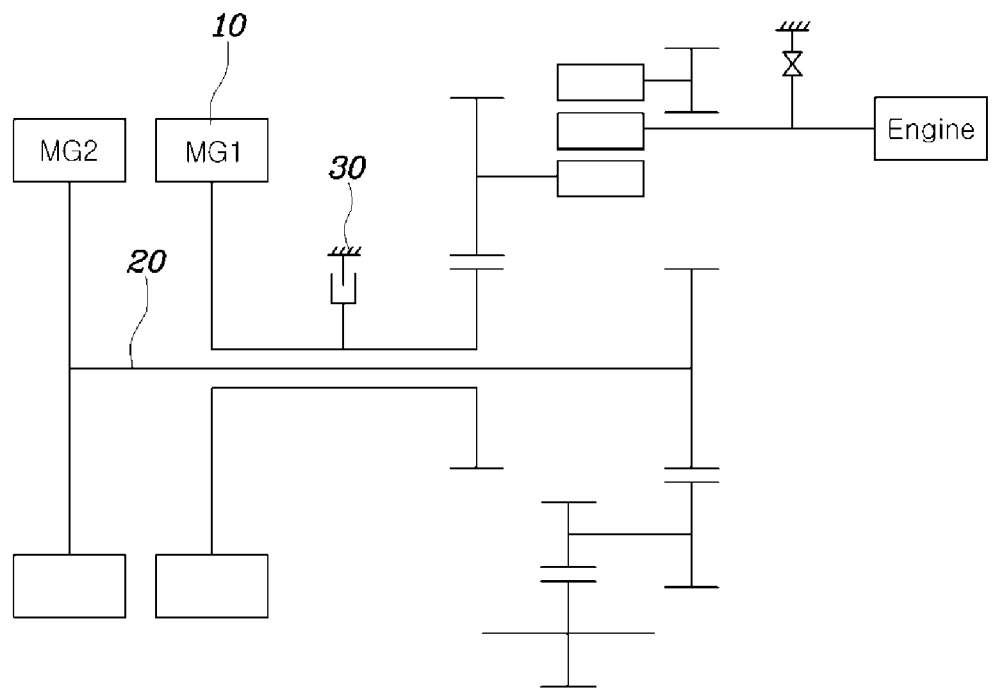
FIG. 1 is a diagram showing a layout of a transmission in the related art.
Figure 2A:
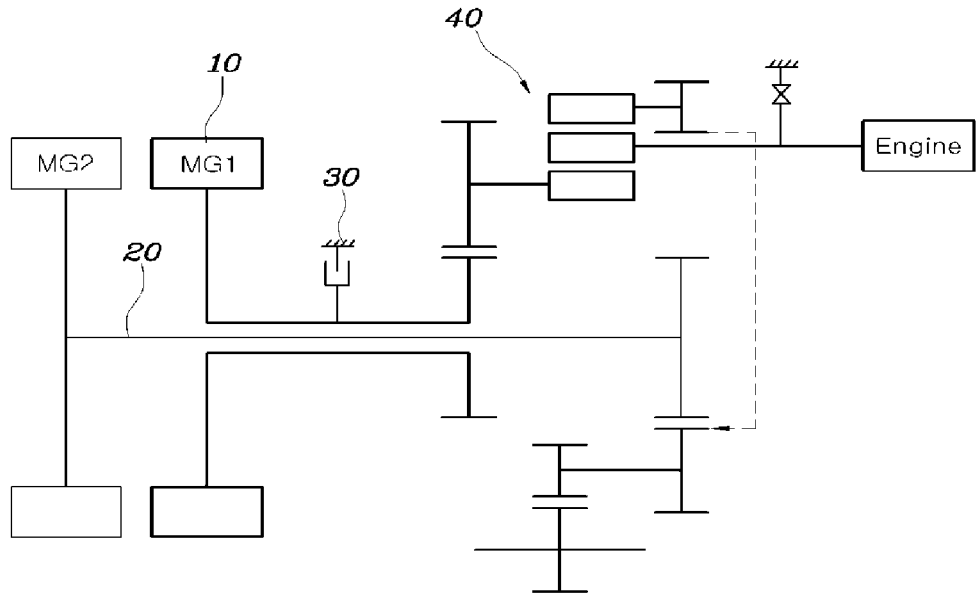
FIG. 2A and FIG. 2B are diagrams showing shifting by the layout of the transmission in overdriving in a high-speed period in the related art.
Figure 2B:
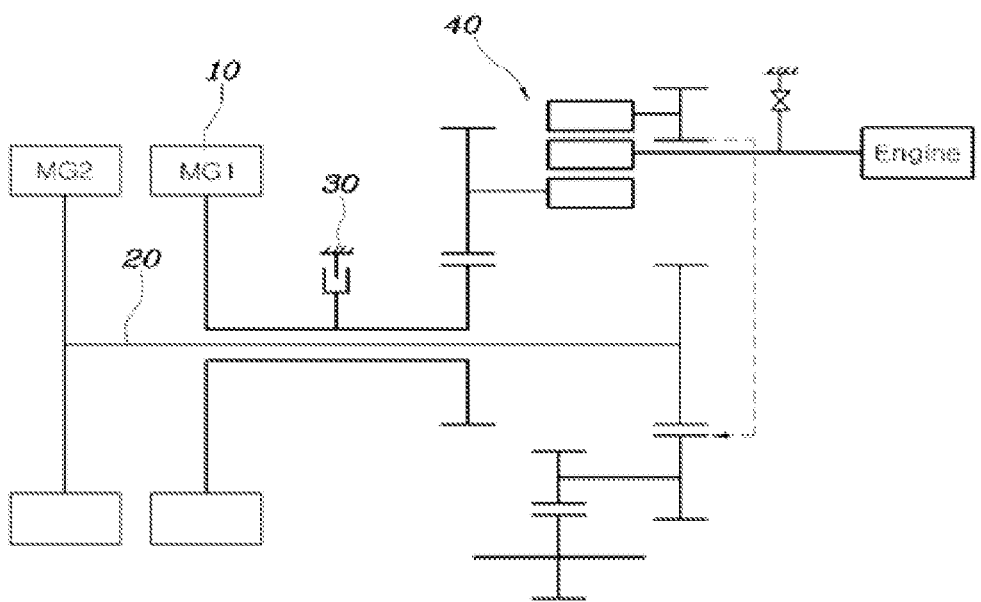

That is, as compared with the layout of a powertrain for a hybrid vehicle of the related art shown in FIG. 1. FIG. 2A and FIG. 2B, the largest difference is that the dog clutch unit is provided instead of the brake restricting revolution of the motor generator.

Though described in detail below, when an 'OD' gear ratio for overdriving a vehicle is implemented by the dog clutch unit 100, a motor generator of the related art synchronizes rotational speeds and the dog clutch unit 100 takes charge of an engagement function, so it can replace the function of a brake.

The dog clutch unit 100 is composed of a sleeve and a hub, which are general synchronizing parts, and a fixing unit 110 for fixing a dog clutch is disposed at a side of the dog clutch unit. The fixing unit generally means a transmission casing, but is not limited thereto and any configuration can be used as long as it can fix the dog clutch.

Referring to FIG. 3 again, the second input shaft 400 to which power from an engine can be transmitted is disposed above the first input shaft 200 and a planetary gear set 300 is disposed at a side of the second input shaft 400.

The planetary gear set 300 is composed of a ring gear 310, a carrier 320, and a sun gear 330, all of which are generally used, and as shown in the figure, the ring gear 310 takes charge of 'output' for transmitting power from the engine, the carrier 320 takes charge of 'input', and the sun gear 330 takes charge of 'reaction'.

Figure 4:
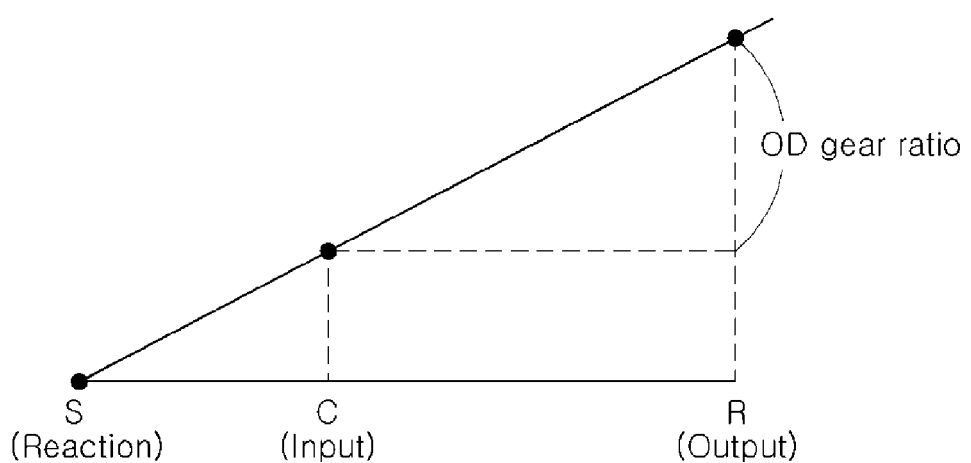
FIG. 4 is a graph showing a rotational speed of a planetary gear set.

Though described in detail below, as shown in FIG. 4 providing a graph showing the speed of the planetary gear set 300, the sun gear 300 of the planetary gear set 300 takes charge of 'reaction' with its rotation restricted when the dog clutch unit 100 is engaged with the fixing unit 110, the carrier 320 is rotated at a predetermined speed by power from the engine, and the ring gear 310 having a speed larger than that of the carrier 320 is rotated, thereby driving a vehicle at an overdrive gear ratio.

That is, when a vehicle is overdriven, the dog clutch unit 100 is engaged with the fixing unit 110 and restricts one of the components of the planetary gear set, thereby achieving an overdrive gear ratio, as shown in FIG. 4.

Referring to FIG. 3 again, a first free gear 210 that is connected to the sun gear 330 of the planetary gear set 300 and that transmits a restricting force when the sleeve of the dog clutch unit 100 is engaged with the fixing unit 110 is disposed at an end of the first input shaft 200.

That is, the first free gear 210 to which a restricting force can be transmitted so that the sun gear 330 performs the function of reaction when the dog clutch 100 is engaged, as shown in FIG. 4, is disposed at an end of the first input shaft 200.

Referring to FIG. 3, a third input shaft 500 having a first rotary gear 510 and a second rotary gear 520 at both ends is provided so that it is connected to the ring gear 310 of the planetary gear set 300 and power from the engine can be transmitted when the dog clutch 100 is engaged.

The third input shaft 500 does not transmit power from a specific power source, but functions as a medium so that the power from the engine can be transmitted to an output shaft 600. As the power from the engine is transmitted to the carrier 320 taking charge of input, it rotates the second rotary gear 520 connected to the ring gear 310 through the ring gear 310 taking charge of output and rotates the first rotary gear 510 at an end of the third input shaft 500, and thus, the power is transmitted to the output shaft 600.

That is, as shown in the figure, the output shaft 600 with a driving gear 610, which is engaged and rotated with the first rotary gear 510, is disposed under the input shaft 200 in the figure, so when a vehicle runs at a high speed, an overdrive gear ratio is implemented and the power from the engine is transmitted to the output shaft 600.

Though described below in detail during shifting for overdriving of the present invention, according to the present invention, when a vehicle runs at a high speed, synchronization is performed by an external power supply by restricting rotation of the motor generator and then the dog clutch unit 100 is engaged with the fixing unit 110.

When a vehicle runs at a high speed, the dog clutch unit 100 is engaged with the fixing unit 110 and rotation of the sun gear 330 of the planetary gear set 300 is restricted, the carrier 320 of the planetary gear set 300 is rotated by the power from the engine, the second rotary gear 520 engaged with the carrier 320 and the driving gear 610 are rotated, and the output shaft 600 is rotated accordingly, thereby implementing an overdrive gear ratio of the vehicle.

FIG. 5A, FIG. 5B, FIG. 5C and FIG. 5D are diagrams showing shifting for overdriving by the layout of the powertrain for a hybrid vehicle of the present invention and so-called Overdrive (OD)-shifting of the present invention is described hereafter with reference to the accompanying drawings.

Figure 5A:
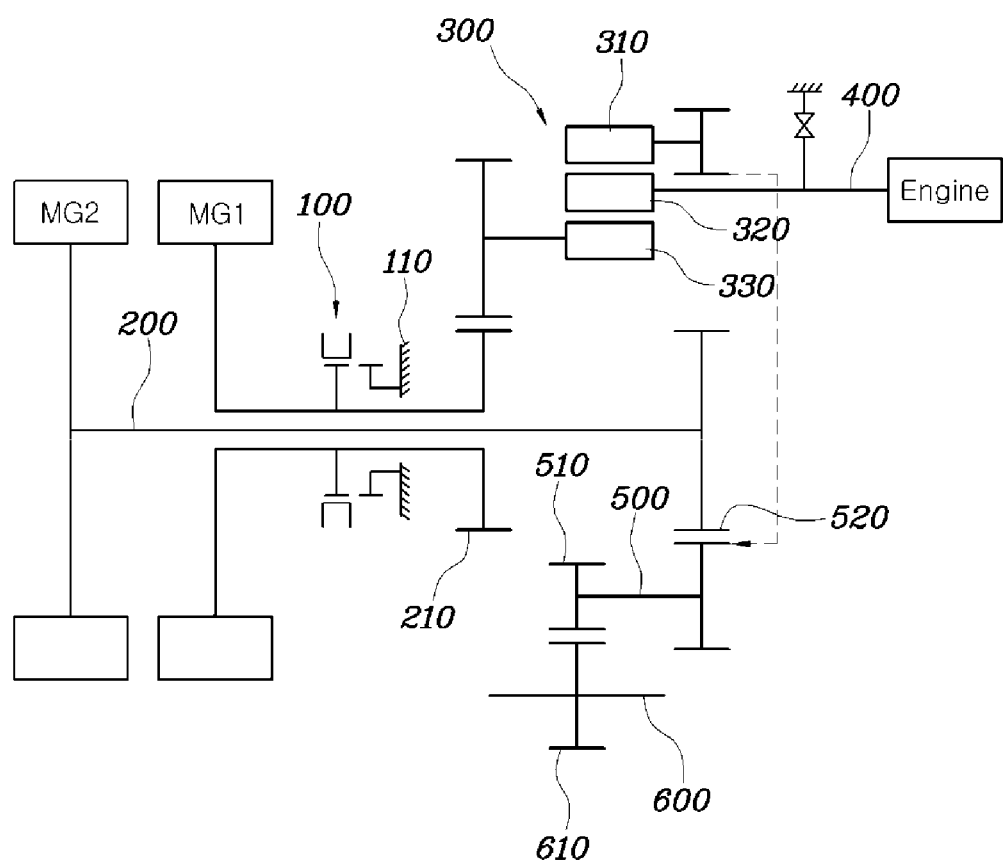
FIG. 5A, FIG. 5B, FIG. 5C, and FIG. 5D are diagrams showing shifting for overdriving by the layout of the powertrain for a hybrid vehicle of the present invention.

FIG. 5A shows normal driving with a motor generator controlled for shifting.

In this state, the sun gear 330 of the planetary gear set 300 is rotated at various speeds by a current continuously supplied from the outside.

Figure 5B:
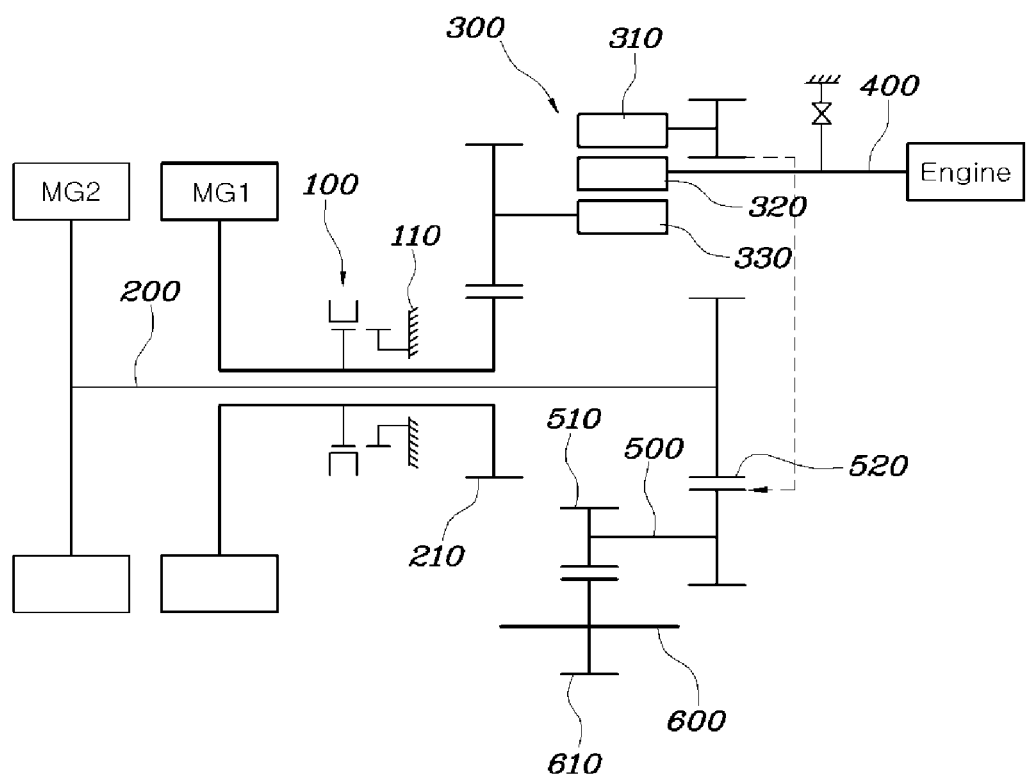

Next, in order to drive a vehicle at a high speed, that is, to implement a so-called OD gear ratio, as shown in FIG. 5B, the motor generator is controlled to be restricted at a speed of '0'.

Since the dog clutch unit 100 is provided instead of a brake used in the related art, synchronization is performed by not the dog clutch unit 100, but instead by the motor generator.

Figure 5C:
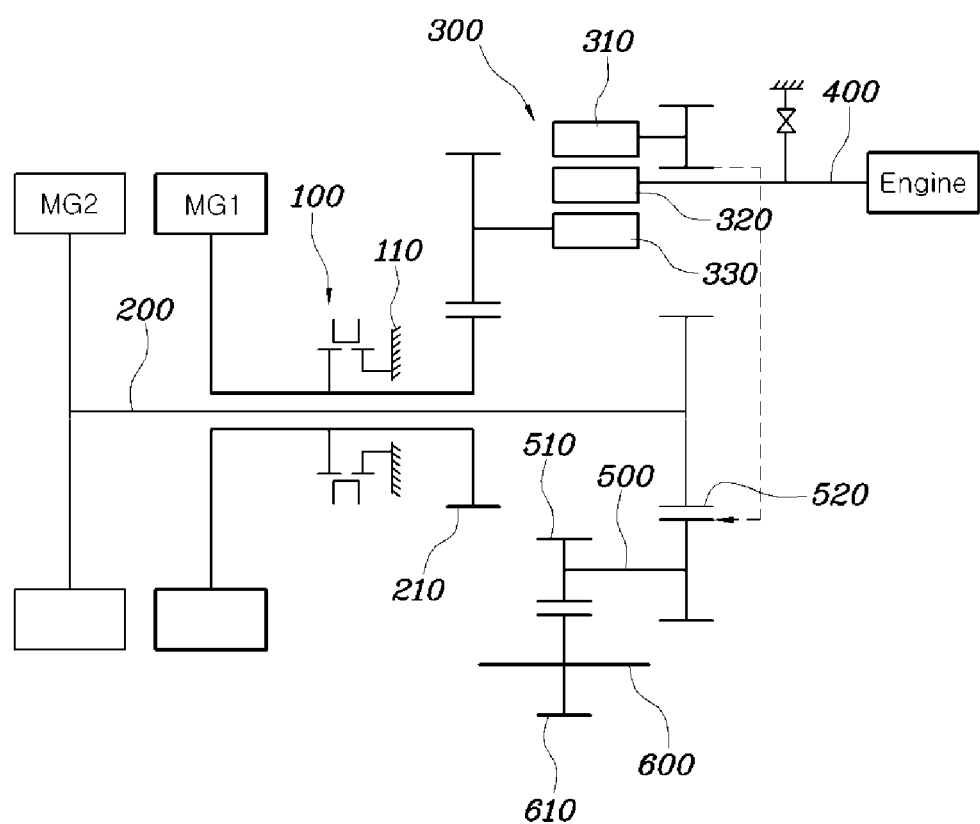

After synchronization is performed by the motor generator, as shown in FIG. 5C, the dog clutch unit 100 is engaged with the fixing unit 110.

Obviously, in this process, a current keeps supplied and the sun gear 330 of the planetary gear set 300 is ready to be fixed by the engagement of the dog clutch unit 100.

Figure 5D:
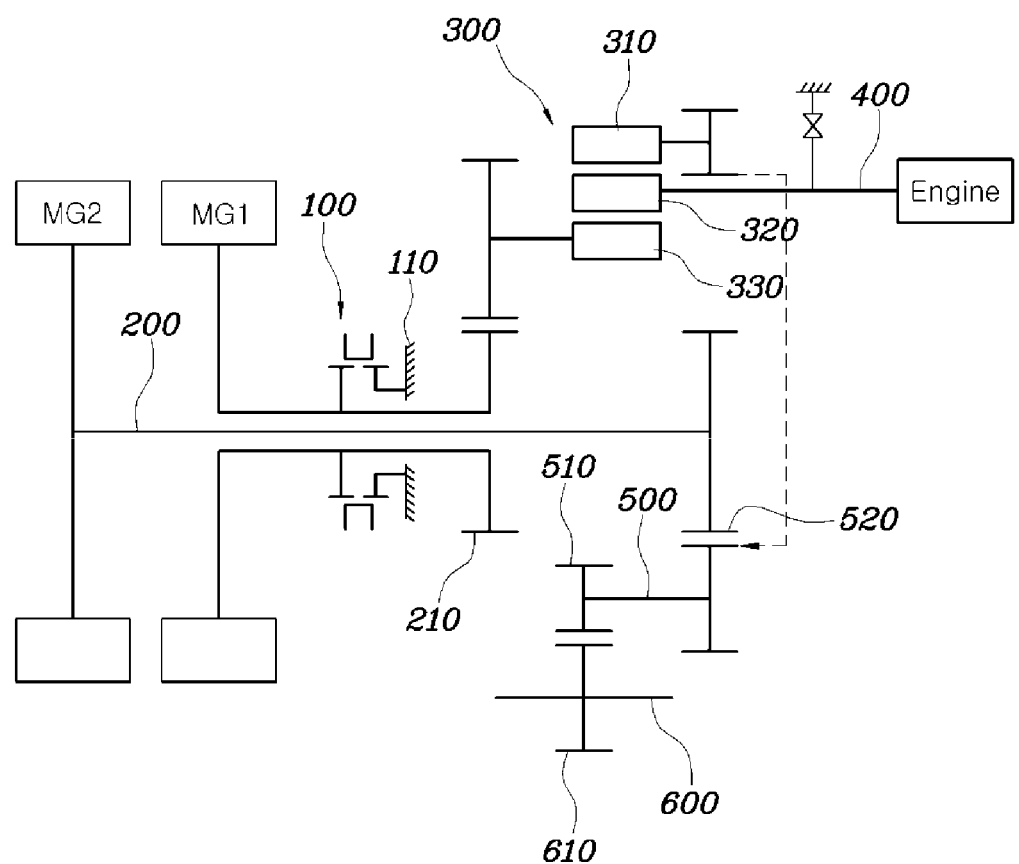

Thereafter, as shown in FIG. 5D, engagement by the dog clutch unit 100 is finished, the rotational speed of the sun gear 330 of the planetary gear set 300 is zero and the vehicle is driven at the OD gear ratio by the power of from the engine in which the speed of the carrier 320 is larger than the speed of the ring gear 310.

According to the present invention having the configuration described above, there is no need of a valve body and an oil pump as used in the related art, by replacing a brake used to implement an OD gear ratio in the related art, with a dog clutch unit, a powertrain for a hybrid vehicle, which is advantageous in terms of weight and manufacturing cost, in addition to improvement of fuel efficiency, is provided.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents

What is claimed is:

1. A powertrain for a hybrid vehicle, comprising:
a first input shaft connected to a motor generator and coupled to a dog clutch apparatus;
a second input shaft connected to an engine and coupled to a planetary gear set,
wherein when the vehicle is overdriven, the dog clutch apparatus is engaged and restricts one component of the planetary gear set,
wherein a first free gear, which is connected to a sun gear that is one of the components of the planetary gear set when the dog clutch is engaged, is disposed at an end of the first input shaft,
wherein a third input shaft having a first rotary gear and a second rotary gear at both ends is provided to be connected to a ring gear of the planetary gear set and to transmit power from the engine when the dog clutch is engaged; and
an output shaft having a driving gear engaged and rotated with the first rotary gear.

2. The powertrain of claim 1, wherein when the vehicle runs at a high speed, synchronization is performed by an external power source by restricting rotation of the motor generator and then the dog clutch apparatus is engaged with a fixing apparatus.

3. The powertrain of claim 2, wherein when the vehicle runs at the high speed, the dog clutch is engaged with the fixing apparatus, rotation of the sun gear of the planetary gear set is restricted, a carrier of the planetary gear set is rotated by power from the engine, and the second rotary gear engaged with the carrier and the driving gear are rotated and transmit power to the output shaft and the vehicle starts to run at an overdrive gear ratio.

4. A powertrain for a hybrid vehicle, comprising:
a first input shaft connected to a motor generator and coupled to a dog clutch apparatus; and
a second input shaft connected to an engine and coupled to a planetary gear set,
wherein when the vehicle is overdriven, the dog clutch apparatus is engaged and restricts one component of the planetary gear set,
wherein a first free gear, which is connected to a sun gear that is one of the components of the planetary gear set when the dog clutch is engaged, is disposed at an end of the first input shaft,
wherein a third input shaft having a first rotary gear and a second rotary gear at both ends is provided to be connected to a ring gear of the planetary gear set and to transmit power from the engine when the dog clutch is engaged, and
wherein when the vehicle runs at a high speed, synchronization is performed by an external power source by restricting rotation of the motor generator and then the dog clutch apparatus is engaged with a fixing apparatus.

5. The powertrain of claim 4, further comprising an output shaft having a driving gear engaged and rotated with the first rotary gear.

6. The powertrain of claim 4, wherein when the vehicle runs at the high speed, the dog clutch is engaged with the fixing apparatus, rotation of the sun gear of the planetary gear set is restricted, a carrier of the planetary gear set is rotated by power from the engine, and the second rotary gear engaged with the carrier and the driving gear are rotated and transmit power to the output shaft and the vehicle starts to run at an overdrive gear ratio.

* * * * *